United States Patent Office 3,488,387
Patented Jan. 6, 1970

3,488,387
PREPARATION OF HALO SUBSTITUTED ACID HALIDES
Louis Schmerling, Riverside, Ill., assignor to Universal Oil Products Company, Des Plaines, Ill., a corporation of Delaware
No Drawing. Continuation-in-part of application Ser. No. 413,613, Nov. 24, 1964. This application Nov. 14, 1966, Ser. No. 593,753
Int. Cl. C07c 51/28, 53/28
U.S. Cl. 260—544   9 Claims

ABSTRACT OF THE DISCLOSURE

Halogenated acid halides are produced by reacting an olefin, carbon monoxide, carbon tetrachloride and a free radical generating compound, the improvement which is effecting the reaction in the presence of a saturated hydrocarbon solvent.

---

This invention relates to the preparation of halogenated acid halides by the reaction of a carbon tetrahalide and carbon monoxide with an olefin. This application is a continuation-in-part of a copending application Ser. No. 413,613, filed Nov. 24, 1964, now abandoned.

It is an object of this invention to present a novel process for the preparation of certain halogenated acid halides useful as acylating agents for the introduction of polyhaloacyl groups. For example, the halogenated acid halides herein contemplated can be utilized as acylating agents for the introduction of polyhaloacyl groups to textile fibers containing amino or hydroxy substituents to form a flame retardant material. The halogenated acid halides are generally useful as chemical intermediates in the preparation of insecticides, pharmaceuticals and other valuable end products.

In one of its broad aspects the present invention relates to a process for reacting an olefin, carbon monoxide, and a carbon tetrahalide in the presence of a free radical generating compound at a temperature of from about 50° C. to about 300° C. and at least as high as the decomposition temperature of the free radical generating compound, and embodies the improvement which comprises effecting the reaction in a saturated hydrocarbon whereby a halogenated acid halide is recovered as an end product of the reaction.

More specifically, the present invention relates to a process for reacting an olefin, carbon monoxide and carbon tetrachloride in the presence of a free radical generating compound decomposable to anhydrous decomposition products at a temperature of from about 50° C. to about 300° C. and at least as high as the decomposition temperature of the free radical generating compound and embodies the improvement which comprises effecting the reaction in a saturated hydrocarbon whereby a chlorinated acid chloride is recovered as an end product of the reaction.

Still more specifically, this invention relates to a process for reacting ethylene, carbon monoxide and carbon tetrachloride in the presence of benzoyl peroxide at a temperature of from about 75° C. to about 225° C. under a pressure of from about 10 to about 2000 atmospheres, and embodies the improvement which comprises effecting the reaction in cyclohexane whereby 4,4,4-trichlorobutyryl chloride is recovered as an end product of the reaction.

Other objects and embodiments of this invention will become apparent in the following detailed specification.

In accordance with the process of this invention halogenated acid halides are prepared by reacting carbon monoxide and a carbon tetrahalide with an olefin. Suitable olefins include ethylene, propylene and higher homologs thereof containing up to about 20 carbon atoms. Suitable olefins also include cycloolefins such as cyclopentene, cyclohexene, etc., and also bicycloalkenes like bicyclo (2.2.1)-2-heptene and arylalkenes such as styrene, etc. Polyolefins such as butadiene and isoprene may also be utilized although not necessarily with the same or equivalent results.

The tetrahalide reactant is preferably carbon tetrachloride, in which case the halogenated acid halide product is a trichloro acid chloride, or carbon tetrabromide, in which case the product is a tribromo acid bromide. Carbon tetrahalides containing bromide and chlorine atoms, for example bromotrichloromethane, dibromodichloromethane, and chlorotribromomethane may also be utilized. Other carbon tetrahalides comprising fluorine and/or iodine atoms, for example bromochlorodifluoromethane, dibromochlorofluoromethane, trifluoroiodomethane, trichlorodiomethane, and the like, are also operable.

Suitable free radical generating compounds include peroxy compounds containing the bivalent —O—O— radical and also azo compounds containing the bivalent —N=N— radical which decompose to form free radicals and initiate the telomerization reaction herein contemplated. Examples of such free radical generating compounds include the persulfates, perborates, and percarbonates of ammonium and of the alkali metals. Organic peroxy compounds constitute one preferred class of peroxy compounds, particularly acyl peroxides like acetyl peroxide, butyryl peroxide, lauroyl peroxide, benzoyl peroxide, diisopropylbenzoyl peroxide, etc., which, upon decomposition, form products which do not effect hydrolysis of the halogenated acid halide products of the process of this invention. Other organic peroxy compounds which can be utilized include peracetic acid, persuccinic acid, dimethyl peroxide, diethyl peroxide, diisopropyl peroxide, di-t-butyl peroxide, tetraline peroxide, urea peroxide, t-butyl perbenzoate, t-butyl hydroperoxide, methylcyclohexyl hydroperoxide, cumene hydroperoxide, methylethyl ketone peroxide, cyclohexanone peroxide, etc., although decomposition products of peroxides such as those last described tend to hydrolyze part of the halogenated acid halide product and such peroxides are therefore somewhat less desirable than the aforesaid acyl peroxides. Mixtures of peroxy compounds may be employed, or said peroxy compounds may be utilized in admixture with various non-aqueous diluents. Thus, commercially available organic peroxy compounds compounded with various diluents, including benzoyl peroxide composited with calcium sulfate, benzoyl peroxide compounded with camphor, etc., may be utilized. Azo compounds, which contain the bivalent —N=N— radical, such as dimethyl alpha-alpha-azodiisobutyrate and particularly azobisisobutyronitrile and its homologs, which decompose to form free radicals, constitute another preferred class of free radical generating compounds.

The present process is effected at a temperature at least as high as the initial decomposition temperature of the particular free radical generating compound employed. Free radical generating compounds decompose at a measurable rate with time in a logarithmic function dependent upon temperature. This rate of decomposition is ordinarily expressed as the half life of the free radical generating compound at a particular temperature. For example, the half life in hours for lauroyl peroxide in paraffin hydrocarbon solvent is 20.6 hours at 60° C., 5.61 hours at 70° C., and 0.76 hour at 85° C. The half life in hours for azobisisobutyronitrile is 2 hours at 80° C. and 0.1 hour at 100° C. A reaction temperature is selected at which the free radical generating compound will decompose with the generation of sufficient free radicals to initiate the condensation reaction and at which temperature the half life of said compound is such as to cause the reaction to proceed smoothly at a suitable rate. When the half life of the free radical generating compound is greater than 10 hours, radicals are not generated at a sufficient rate to cause the contemplated reaction to go forward at a satisfactory rate. Thus, the reaction temperature may be within the range of from about 50° C. to about 300° C. and at least as high as the decomposition temperature of the free radical generating compound, by which is meant a temperature such that the half life of the free radical generating compound is usually not greater than 10 hours. Since the half life for each free radical generating compound is different at different temperatures, the exact temperature to be utilized in a particular reaction will vary. However, persons skilled in the art are well acquainted with the half life vs. temperature data for different free radical generating compounds. Thus it is within the skill of one familiar with the art to select the particular temperature needed for any particular initiator. However, the operating temperature generally should not exceed the decomposition temperature of the free radical generating compound by substantially more than about 150° C. since free radical generating catalysts decompose rapidly under such high temperature conditions. For example, the half life of benzoyl peroxide is less than 10 hours at 75° C., and therefore when this peroxy compound is used, the reaction temperature is from about 75° C. to about 300° C., but generally lower than about 225° C. A reaction temperature of from about 130° C. to about 280° C. is suitable when the peroxy compound is di-t-butyl peroxide, and of from about 110° C. to about 300° C., but generally not in excess of about 260° C., with t-butyl perbenzoate. Higher reaction temperatures may be employed, but little advantage is gained if the temperature is in excess of the decomposition temperature of the free radical generating compound by more than about 150° C. as hereinbefore mentioned. The free radical generating compound can be utilized in relatively low concentration, for example, from about 0.1 to about 10 weight percent based on the weight of the tetrahalomethane reactant.

The concentration of the reactants in the reaction mixture may be varied over a relatively wide range. The carbon monoxide, being somewhat less reactive than the carbon tetrahalide reactant, is generally utilized in a molar excess thereof, usually at least about a 2 to 1 molar excess. The concentration of the olefin reactant is in conformity with the desired products. For example, when the desired products are telomers, i.e. products containing more than one olefin moiety, the olefin is utilized in a molar excess of up to about 10 to 1 or more with respect to the carbon monoxide reactant.

Although in some cases the process of this invention is operable at atmospheric pressure, it is beneficial to employ superatmospheric pressures up to about 2000 atmospheres or more. A pressure in the range of from about 10 to about 2000 atmospheres is preferred.

Although hydrocarbons in general are useful as solvents or diluents to control reaction conditions in accordance with prior art practice, the saturated hydrocarbons utilized in accordance with this invention are, in addition, useful in directing the course of the reaction to give an improved yield of desired product, i.e., halogenated acid halides.

Saturated hydrocarbons which can be employed include the straight and branched chain saturated hydrocarbons, for example, methane, ethane, propane, butane, isobutane, pentane, isopentane, hexane, etc., and higher homologues thereof such as dodecane, tridecane, tetradecane, and the like, and particularly cycloalkanes like cyclopentane, methylcyclopentane, cyclohexane, methylcyclohexane, and the like. While the prior art, as represented by U.S. Patent 2,680,763 issued to Brubaker, teaches the reaction of an olefin, carbon tetrachloride, carbon monoxide and a catalyst substantially as herein described, the art fails to recognize or teach the significance of a particular diluent with respect to the recovery of halogenated acid halides as end products of the reaction. In fact, said prior art teaches that the reaction may or may not be carried out in the presence of a diluent. The only significance attached to a diluent is that it may be employed as a reactant, for example, an alcohol or water to yield a methyl ester or carboxylic acid respectively. While benzene is disclosed as an inert solvent, benzene is substantially ineffective in the recovery of halogenated acid halides as herein contemplated. That the art does not recognize nor teach the significance of a saturated hydrocarbon diluent becomes apparent from the teaching of Brubaker (supra) classing cyclohexane with carbontetrachloride as a suitable chain transfer agent, no mention being made of its unique effect as a diluent. It is of course apparent that should a compound such as cyclohexane be utilized as a chain transfer agent, the products would be other than those herein contemplated. While the prior art does refer to a halogenated acid halide, the reference is with respect to an unrecoverable intermediate (by prior art methods) and not with respect to a recoverable end product of the reaction. Thus, by the improvement of this invention halogenated acid halides are recovered as end products of the reaction and in an improved yield.

The following examples are presented in illustration of the process of this invention and are not intended as a limitation of the generally broad scope of this invention as set out in the appended claims.

EXAMPLE I

Fifty-one grams of carbon tetrachloride, 27 grams of cyclohexane and 5 grams of benzoyl peroxide were placed in a glass liner which was then inserted in a rotatable steel autoclave of 850 cubic centimeters capacity. The autoclave was flushed with dry nitrogen and sealed. Carbon monoxide was then pressured into the autoclave to bring the pressure to about 40 atmospheres and then ethylene was added to bring the total initial pressure to about 60 atmospheres at room temperature. The autoclave was rotated and heated at a temperature of 80 to 110° C. over a 5 hour period, the maximum pressure reaching 72 atmospheres. The final pressure at room temperature was 50 atmospheres. Unreacted carbon monoxide and ethylene were discharged from the autoclave and about 96 grams of a clear reddish liquid product recovered from the glass liner. The liquid product was distilled at reduced pressure and 4,4,4-trichlorobutyryl chloride, 6,6,6-trichlorohexanoyl chloride (formed by the reaction of 1 mole of carbon tetrachloride and 1 mole of carbon monoxide with 2 moles of ethylene), cyclohexanecarbonyl chloride (formed by the reaction of 1 mole each of cyclohexane, carbon tetrachloride and carbon monoxide) and cyclohexyl chloride were recovered in 39%, 4%, 15% and 16% yield respectively. The identity of the products was confirmed by nuclear magnetic resonance analysis.

EXAMPLE II

This example illustrates the marked advantage of using a saturated hydrocarbon in the process of this invention. Example I was repeated but benzene was used instead of cyclohexane. Fifty grams of carbon tetrachloride, 25 grams of benzene and 5 grams of benzoyl peroxide were placed in a glass liner of a rotatable steel autoclave as in Example I. After flushing the autoclave with dry nitrogen and sealing it, carbon monoxide was pressured in to bring the pressure to about 40 atmospheres and the ethylene was added to bring the total initial pressure to about 60 atmospheres at room temperature. The autoclave was rotated and heated at a temperature of 80 to 110° C. over a period of 5 hours, the maximum pressure reaching 83 atmospheres. The final pressure at room temperature was 55 atmospheres. Unreacted carbon monoxide and ethylene were discharged from the autoclave and about 80 grams of dark amber liquid were recovered from the glass liner. The liquid product was distilled under reduced pressure. Less than a 3% yield of 4,4,4-trichlorobutyryl chloride and less than 3% 6,6,6-trichlorohexanoyl chloride was obtained together with 6% of benzoyl chloride (formed by reaction of carbon tetrachloride with benzoyl radicals produced by the decomposing peroxide).

EXAMPLE III

Fifty-one grams of carbon tetrachloride, 27 grams of cyclohexane and 4 grams of lauroyl peroxide were placed in a glass liner of a rotatable steel autoclave as in Example I. The autoclave was flushed with dry nitrogen and sealed. Carbon monoxide was pressured into the autoclave to bring the pressure to about 40 atmospheres. Ethylene was then pressured into the autoclave to bring the total initial pressure to about 60 atmospheres at room temperature. The autoclave was rotated and heated to a temperature of 60 to 80° C. over about a 5 hour period, the maximum pressure reaching 65 atmospheres. The final pressure at room temperature was 50 atmospheres. Unreacted carbon monoxide and ethylene were discharged from the autoclave and liquid product recovered from the glass liner. The liquid product was distilled at reduced pressure to yield 35% 4,4,4-trichlorobutyryl chloride, 8% 6,6,6-trichlorohexanoyl chloride and 11% cyclohexanecarbonyl chloride.

EXAMPLE IV

Fifty-one grams of carbon tetrachloride, 50 grams of cyclohexane, and 2 grams of azobisisobutyronitrile were placed in a glass liner of a rotatable steel autoclave as in Example I. The autoclave was flushed with dry nitrogen and sealed. Carbon monoxide was then pressured into the autoclave to bring the pressure to about 30 atmospheres and thereafter ethylene was pressured into the autoclave to bring the total initial pressure to about 60 atmospheres at room temperature. The autoclave was rotated and heated to a temperature of 60 to 100° C. over a period of 3.5 hours. The maximum pressure reaching 80 atmospheres. The final pressure at room temperature was 55 atmospheres. Unreacted carbon monoxide and ethylene were discharged from the autoclave and the liquid product recovered from the glass liner. The liquid product was distilled at reduced pressure and 4,4,4-trichlorobutyryl chloride and 6,6,6-trichlorohexanoyl chloride were recovered in 26% and 8% yields, respectively. There was a significant difference between the results obtained with the benzoyl peroxide of Example I and that obtained with the azobisisobutyronitrile of this example. In the former case the reaction product contained a significant amount of acid chloride (cyclohexanecarbonyl chloride) formed from the saturated hydrocarbon solvent. With the latter none was observed. This can readily be explained on the basis that azobisisobutyronitrile is substantially less active in catalyzing the reaction of carbon tetrachloride with cyclohexane than that of carbon tetrachloride with ethylene.

EXAMPLE V

Fifty-two grams of carbon tetrachloride, 25 grams of tetradecane, and 5 grams of benzoyl peroxide were placed in a glass liner of a rotatable steel autoclave as in Example I. The autoclave was flushed with dry nitrogen, sealed and carbon monoxide pressured into the autoclave to bring the pressure to 40 atmospheres. Thereafter ethylene was added to bring the total initial pressure to 60 atmospheres at room temperature. The autoclave was rotated and heated to a temperature of 80 to 110° C. over a 5 hour period, the maximum pressure reaching 86 atmospheres. The final pressure at room temperature was 60 atmospheres. Unreacted carbon monoxide and ethylene were discharged from the autoclave and the liquid product recovered from the glass liner. The liquid product was distilled at reduced pressure and the 4,4,4-trichlorobutyryl chloride was recovered.

EXAMPLE VI

Fifty-two grams of carbon tetrachloride, and 6 grams of benzoyl peroxide, were placed in a glass liner which was then inserted in a rotatable steel autoclave. The autoclave was flushed with dry nitrogen and sealed. Forty-five grams of isobutane were then charged to the autoclave. Carbon monoxide was then pressured into the autoclave to bring the pressure to about 40 atmospheres followed by ethylene to bring the total initial pressure to about 60 atmospheres at room temperature. The autoclave was rotated and heated to a temperature of 80 to 110° C. over a 5 hour period, the maximum pressure reaching 90 atmospheres. The final pressure at room temperature was 60 atmospheres. Unreacted isobutane, carbon monoxide, and ethylene were discharged from the autoclave and the liquid product recovered from the glass liner. The liquid product was distilled at reduced pressure to yield the trichlorobutyryl chloride and pivaloyl chloride by-product.

EXAMPLE VII

One hundred grams of carbon tetrachloride, 10 grams of cyclohexane and 4 grams of azobisisobutyronitrile were placed in a glass liner of a rotatable steel autoclave as in Example I. The autoclave was flushed with dry nitrogen, sealed, and 100 milliliters of propylene were forced into the autoclave. Carbon monoxide was then pressured in to bring the pressure to 50 atmospheres. The autoclave was then rotated and heated at a temperature of 60 to 100° C. over a 5 hour period, the maximum pressure reaching 70 atmospheres. The final pressure at room temperature was 48 atmospheres. The unreacted carbon monoxide and propylene were discharged from the autoclave and the liquid which was recovered from the liner was distilled under reduced pressure. There were obtained 24 grams of a mixture, boiling at 65 to 107° C. at 6.5 millimeters, comprising trichloroacyl chlorides.

I claim as my invention:

1. In the process of reacting an olefin, carbon monoxide and a carbon tetrahalide in the presence of a free radical generating compound at a temperature of from about 50° C. to about 300° C. and at least as high as the decomposition temperature of the free radical generating compound, the improvement which comprises effecting the reaction in a saturated hydrocarbon whereby a halogenated acid halide is recovered as an end product of the reaction.

2. The process of claim 1 further characterized in that said olefin is a mono-olefin.

3. The process of claim 2 further characterized in that said mono-olefin is an alkene.

4. The process of claim 3 further characterized in that said carbon tetrahalide is carbon tetrachloride and said halogenated acid halide is a chlorinated acid halide.

5. The process of claim 4 further characterized in that said alkene is ethylene, and further characterized in that said free radical generating compound is benzoyl peroxide, said temperature being from about 75° C. to about 225° C.

6. The process of claim 5 further characterized in that said saturated hydrocarbon is cyclohexane.

7. The process of claim 5 further characterized in that said saturated hydrocarbon is tetradecane.

8. The process of claim 4 further characterized in that said alkene is ethylene, and further characterized in that said free radical generating compound is azobisbutyronitrile, said temperature being from about 60° C. to about 210° C.

9. The process of claim 8 further characterized in that said saturated hydrocarbon is cyclohexane.

References Cited

UNITED STATES PATENTS 2,680,763    6/1954    Brubaker _____ 210—544

OTHER REFERENCES

Walling, "Free Radicals in Solution," (1957) pp. 150–155.

LORRAINE A. WEINBERGER, Primary Examiner

E. J. GLEIMAN, Assistant Examiner